(12) United States Patent
Miyazaki

(10) Patent No.: US 10,691,405 B2
(45) Date of Patent: Jun. 23, 2020

(54) SOUND CONTROL APPARATUS, SOUND CONTROL METHOD, AND PROGRAM

(71) Applicant: SONY INTERACTIVE ENTERTAINMENT INC., Tokyo (JP)

(72) Inventor: Yoshio Miyazaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/463,293

(22) PCT Filed: Dec. 4, 2017

(86) PCT No.: PCT/JP2017/043459
§ 371 (c)(1),
(2) Date: May 22, 2019

(87) PCT Pub. No.: WO2018/105552
PCT Pub. Date: Jun. 14, 2018

(65) Prior Publication Data
US 2019/0294410 A1   Sep. 26, 2019

(30) Foreign Application Priority Data
Dec. 9, 2016   (JP) ................................ 2016-239645

(51) Int. Cl.
*G06F 3/16*   (2006.01)
*G06F 3/01*   (2006.01)
(Continued)

(52) U.S. Cl.
CPC ............... *G06F 3/165* (2013.01); *G01C 3/06* (2013.01); *G06F 3/01* (2013.01); *G06F 3/011* (2013.01);
(Continued)

(58) Field of Classification Search
CPC . G06F 3/011; G06F 3/165; G06F 3/01; G06F 3/16; H04R 2430/01; H04R 29/001; G01C 3/06; G10L 21/003; G10L 21/034
(Continued)

(56) References Cited

U.S. PATENT DOCUMENTS

| | | | |
|---|---|---|---|
| 2011/0242102 A1* | 10/2011 | Hess ...................... | B60K 35/00 345/419 |
| 2017/0123752 A1* | 5/2017 | Nadler .................... | G06F 3/165 |

(Continued)

FOREIGN PATENT DOCUMENTS

| JP | 2005-165778 A | 6/2005 |
|---|---|---|
| JP | 2015-191124 A | 11/2015 |
| JP | 2015191124 A * | 11/2015 |

OTHER PUBLICATIONS

International Search Report and Written Opinion dated Jan. 9, 2018, from International Application No. PCT/JP2017/043459, 7 sheets.

*Primary Examiner* — Vivian C Chin
*Assistant Examiner* — Friedrich Fahnert
(74) *Attorney, Agent, or Firm* — Katten Muchin Rosenman LLP (57) ABSTRACT

Provided are a sound control apparatus, a sound control method, and a program, which are capable of notifying a user that an object is approached without decreasing an immersion feeling of a user. A sound output control section (70) controls a sound to be output to the user. A distance specification section (78) specifies a distance between the user wearing a head-mounted display and an object existing around the user. A sound changing section (82) changes an output mode of the sound output to the user in accordance with a change in the distance between the user and the object existing around the user generated when the sound is output to the user.

6 Claims, 6 Drawing Sheets

(51) Int. Cl.
*G10L 21/003* (2013.01)
*G10L 21/034* (2013.01)
*G01C 3/06* (2006.01)
*H04R 29/00* (2006.01)

(52) U.S. Cl.
CPC ............ *G06F 3/16* (2013.01); *G10L 21/003* (2013.01); *G10L 21/034* (2013.01); *H04R 29/001* (2013.01); *H04R 2430/01* (2013.01)

(58) Field of Classification Search
USPC .......................... 381/61, 104, 107, 108, 109
See application file for complete search history.

(56) References Cited

U.S. PATENT DOCUMENTS

2017/0359467 A1* 12/2017 Norris .................... G06F 3/165
2017/0374486 A1* 12/2017 Killham ............... H04N 13/279

\* cited by examiner

SOUND CONTROL APPARATUS, SOUND CONTROL METHOD, AND PROGRAM

TECHNICAL FIELD

The present invention relates to a sound control apparatus, a sound control method, and a program.

BACKGROUND ART

There exists a head-mounted display (HMD) that is worn on a head by a user and by which a video image to be displayed in front of eyes of the user can be appreciated. In this HMD, generally, it is possible for the user to listen to a sound linked with a video image via headphones that are separated from the HMD or a speaker built-in the HMD.

SUMMARY

Technical Problems

In some contents of a game or the like corresponding to this HMD, a video image to be displayed changes when the user wearing the HMD moves or changes a direction of the head. Further, when the user that enjoys this content moves while wearing the HMD, an object existing around the user such as an obstacle or a wall may be approached by the user.

In order to notify the user that an object is approached, it is considered that a warning sound is output from a speaker or headphones when the user approaches the object. Alternatively, it is considered that an object corresponding to the object that is approached by the user is displayed on the HMD.

However, this may decrease an immersion feeling of the user wearing the HMD.

The present invention has been made in view of the above circumstances. An object of the present invention is therefore to provide a sound control apparatus, a sound control method, and a program that are capable of notifying the user that an object is approached without decreasing the immersion feeling of the user.

Solution to Problems

In order to solve the above-mentioned problems, a sound control apparatus according to the present invention includes a sound output control section configured to control a sound to be output to a user; a distance specification section configured to specify a distance between the user wearing a head-mounted display and an object existing around the user; and a changing section configured to change an output mode of the sound output to the user in accordance with a change in the distance generated when the sound is output to the user.

In a mode of the present invention, the changing section changes the output mode of the sound output to the user in accordance with the change in the distance generated when the sound is output at a volume set by the user.

Further, in a mode of the present invention, the changing section changes the volume of the sound output to the user in accordance with the change in the distance generated when the sound is output to the user.

In this mode, the changing section may change the volume of the sound output to the user so as to be output at the volume of a magnitude obtained by subtracting the volume set by the user by a magnification according to the distance.

Further, in a mode of the present invention, the changing section changes a frequency characteristic of the sound output to the user in accordance with the change in the distance generated when the sound is output to the user.

Further, in a mode of the present invention, the changing section changes the output mode of the sound output to the user when a distance between the user and the object is shorter than a predetermined distance.

Further, in a mode of the present invention, the sound output control section reproduces a stored audio file or a received audio stream, and the changing section changes reproduction volume of the audio file or the audio stream reproduced by the sound output control section in accordance with the change in the distance generated when the audio file or the audio stream is reproduced.

Further, a sound control method according to the present invention includes a step of controlling a sound to be output to a user; a step of specifying a distance between the user wearing a head-mounted display and an object existing around the user; and a step of changing an output mode of the sound output to the user in accordance with a change in the distance generated when the sound is output to the user.

Further, a program according to the present invention causes a computer to execute a procedure for controlling a sound to be output to a user; a procedure for specifying a distance between the user wearing a head-mounted display and an object existing around the user; and a procedure for changing an output mode of the sound output to the user in accordance with a change in the distance generated when the sound is output to the user.

DESCRIPTION OF EMBODIMENT

Hereinafter, an embodiment of the present invention will be described with reference to the drawings.

Figure 1:
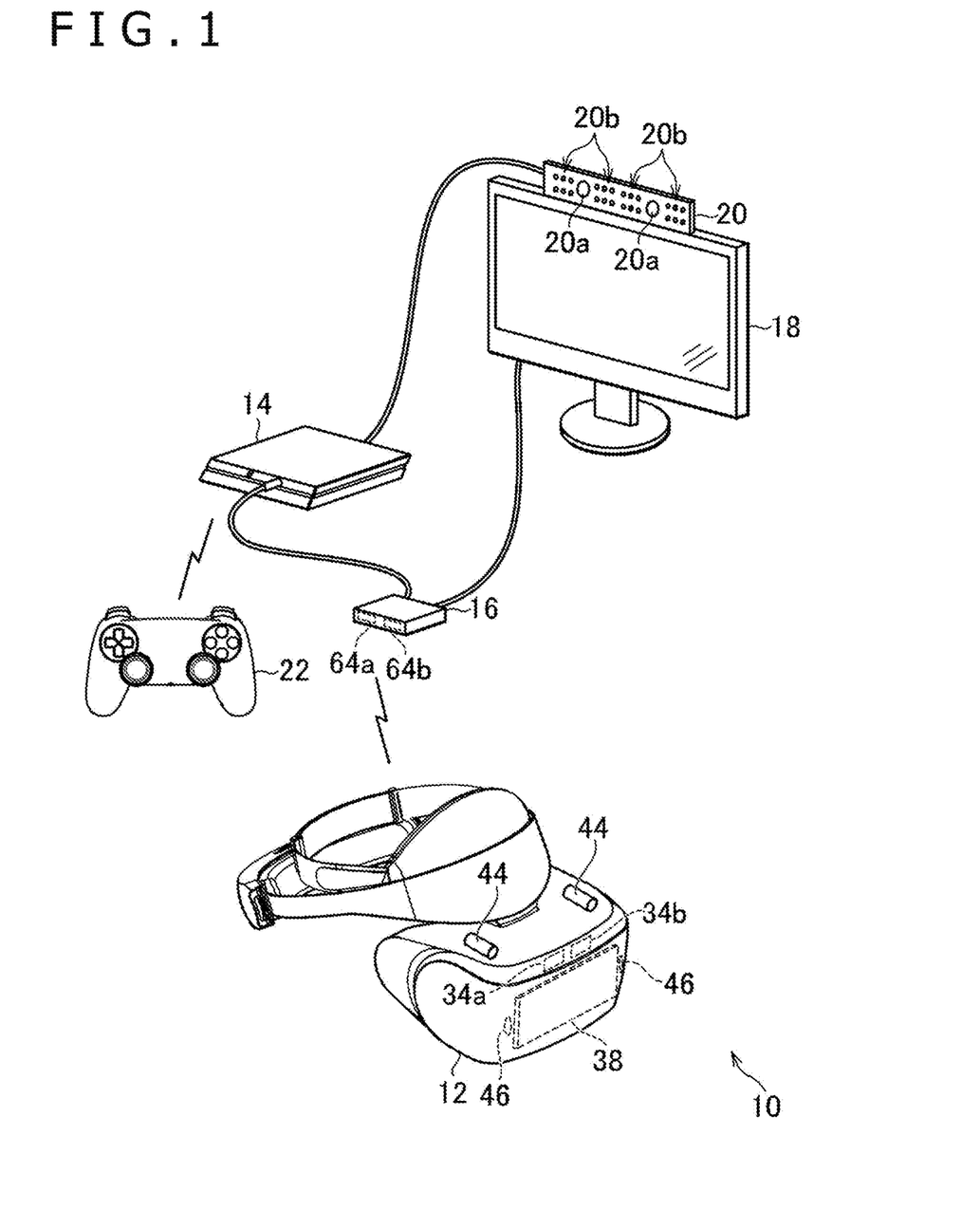
FIG. 1 is a diagram illustrating an example of the entire configuration of an entertainment system according to an embodiment of the present invention.
Figure 2A:
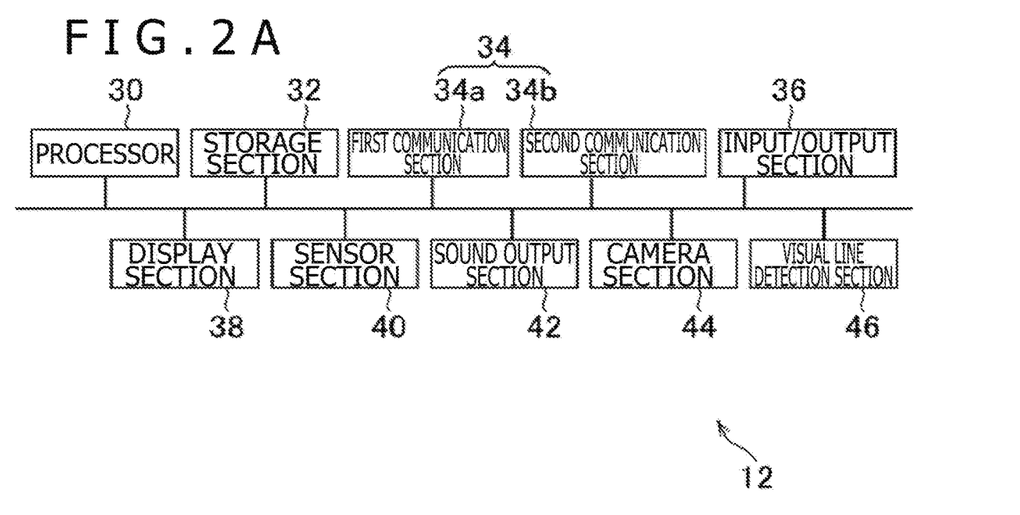
FIG. 2A is a diagram illustrating an example of a configuration of a head-mounted display according to the embodiment of the present invention.
Figure 2B:
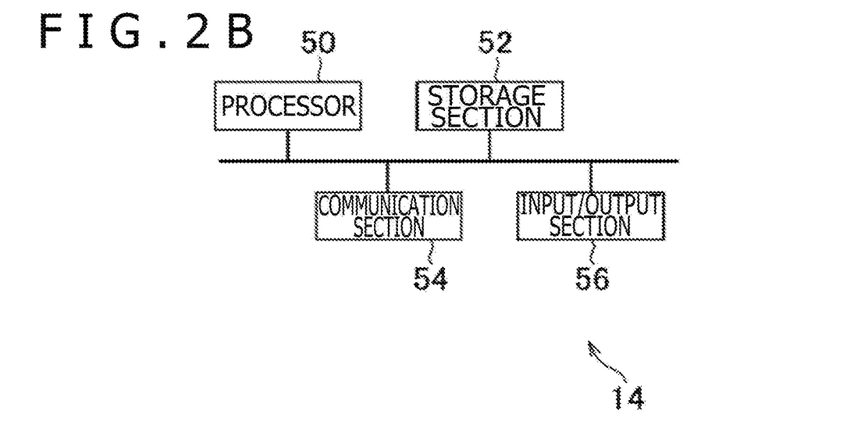
FIG. 2B is a diagram illustrating an example of a configuration of an entertainment apparatus according to the embodiment of the present invention.
Figure 2C:
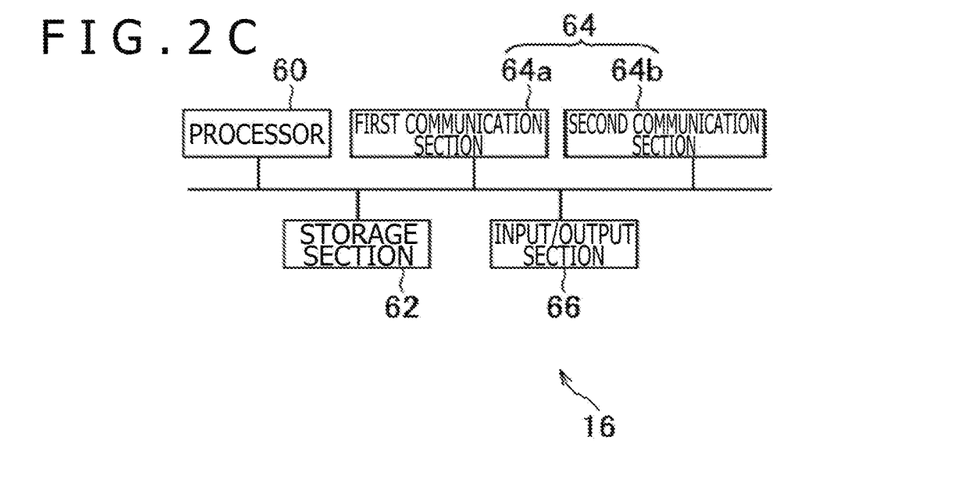
FIG. 2C is a diagram illustrating an example of a configuration of a relay apparatus according to the embodiment of the present invention.

FIG. 1 is a diagram illustrating an example of the entire configuration of an entertainment system 10 according to the embodiment of the present invention. FIG. 2A is a diagram illustrating an example of a configuration of an HMD 12 according to the present embodiment. FIG. 2B is a diagram illustrating an example of a configuration of an entertainment apparatus 14 according to the present embodiment. FIG. 2C is a diagram illustrating an example of a configuration of a relay apparatus 16 according to the present embodiment.

As illustrated in FIG. 1, the entertainment system 10 according to the present embodiment includes an HMD 12, an entertainment apparatus 14, a relay apparatus 16, a display 18, a camera-microphone unit 20, and a controller 22.

The HMD 12 according to the present embodiment includes a processor 30, a storage section 32, two communication sections 34 (a first communication section 34a and a second communication section 34b), an input/output section 36, a display section 38, a sensor section 40, a sound output section 42, a camera section 44, and a visual line detection section 46 as illustrated in FIG. 2A, for example.

The processor 30 is a program control device such as a microprocessor that operates in accordance with a program installed in the HMD 12, for example. Note that a control circuit capable of an implementation of processing that is executed by the processor 30 may be included in the HMD 12 in place of the processor 30.

The storage section 32 is, for example, a storage device such as a read-only memory (ROM) or a random access memory (RAM). The storage section 32 stores a program and the like that are executed by the processor 30.

The first communication section 34a and the second communication section 34b respectively are communication interfaces such as a wireless LAN module. In the present embodiment, as illustrated in FIG. 1, the first communication section 34a and the second communication section 34b are disposed in the upper front side of the HMD 12.

In the present embodiment, the communication standard for communication handled by the first communication section 34a differs from the communication standard for communication handled by the second communication section 34b. For example, the first communication section 34a engages in communication in a 60 GHz band, and the second communication section 34b engages in communication in a 5 GHz band or 2.4 GHz band. Hereinafter, it is assumed that a frequency band used for communication handled by the first communication section 34a is referred to as a high frequency band and a frequency band used for communication handled by the second communication section 34b is referred to as a low frequency band.

Communication in the high frequency band offers a higher maximum possible transmission rate than communication in the low frequency band. Also, communication in the high frequency band has higher straight-line-travel property and shorter possible communication distance than communication in the low frequency band.

The input/output section 36 is an input/output port such as a high-definition multimedia interface (HDMI, registered trademark) port, a USB port, or an AUX port.

The display section 38 is a display such as a liquid crystal display or an organic electroluminescence (EL) display that is disposed on the front side of the HMD 12 and displays a video image and the like that are generated by the entertainment apparatus 14. Further, the display section 38 is housed in a chassis of the HMD 12. For example, the display section 38 may be configured to receive a video image signal output by the entertainment apparatus 14 and relayed by the relay apparatus 16 and output a video image represented by the received video image signal. The display section 38 according to the present embodiment is, for example, configured to display a three-dimensional image by displaying an image for the right eye and an image for the left eye. Note that the display section 38 may be configured to only display a two-dimensional image instead of a three-dimensional image.

The sensor section 40 is a sensor such as a motion sensor capable of detecting an accelerated velocity or angular velocity. The sensor section 40 outputs detection results such as a rotational amount and movement amount of the HMD 12 to the processor 30 at a predetermined sampling rate. In addition, the sensor section 40 may include a proximity sensor capable of detecting wear of the HMD 12 by a user.

The sound output section 42 is a headphone or a speaker, for example, and outputs sound and the like represented by audio data generated by the entertainment apparatus 14. For example, the sound output section 42 receives an audio signal output by the entertainment apparatus 14 and relayed by the relay apparatus 16 and outputs a sound represented by the received audio signal.

The camera section 44 is a camera such as a digital camera, and photographs states around the user wearing the HMD 12 at a predetermined frame rate. As illustrated in FIG. 1, the camera section 44 according to the present embodiment is mounted in two units on top of the display section 38 so as to be capable of photographing a forward direction of the display section 38. Therefore, the camera section 44 according to the present embodiment is capable of photographing the forward direction of the user wearing the HMD 12. In addition, the camera section 44 according to the present embodiment is a stereoscopic camera including a lens for photographing an image for the left eye and a lens for generating an image for the right eye, for example.

The visual line detection section 46 is a sensor that detects a visual line of the user wearing the HMD 12. The visual line detection section 46 is, for example, disposed at an inner side of the chassis of the HMD 12. Further, the visual line detection section 46 may include an infrared camera that detects a line-of-sight direction of the user wearing the HMD 12.

The entertainment apparatus 14 according to the present embodiment is a computer such as a game console, a DVD player, or Blu-ray (registered trademark) player. The entertainment apparatus 14 according to the present embodiment generates a video image and sound by the execution of a stored game program or the reproduction of content recorded on an optical disk, for example. Then, the entertainment apparatus 14 according to the present embodiment outputs a video image signal representative of a generated video image and an audio signal representative of a generated sound to the HMD 12 and the display 18 via the relay apparatus 16.

As illustrated in FIG. 2B, for example, the entertainment apparatus 14 according to the present embodiment includes a processor 50, a storage section 52, a communication section 54, and an input/output section 56.

The processor 50 is a program control device such as a CPU that operates in accordance with a program installed on the entertainment apparatus 14, for example. The processor 50 according to the present embodiment also includes a graphics processing unit (GPU) that draws an image in a frame buffer based on a graphics command or data supplied from the CPU. Note that the entertainment apparatus 14 may include a control circuit capable of implementing processing executed by the processor 50 in place of the processor 50.

The storage section 52 is, for example, a storage device such as a ROM and a RAM, a hard disk drive, or the like. Programs and the like executed by the processor 50 are stored in the storage section 52. Further, an area of a frame buffer for the GPU to draw an image is reserved in the storage section 52 according to the present embodiment.

The communication section 54 is a communication interface such as a wireless local area network (LAN) module.

The input/output section 56 is an input/output port such as an HDMI port or a USB port.

The relay apparatus 16 according to the present embodiment is a computer that relays a video image signal or an audio signal output from the entertainment apparatus 14 and outputs the relayed signals to the HMD 12 and the display 18.

As illustrated in FIG. 2C, for example, the relay apparatus 16 according to the present embodiment includes a processor 60, a storage section 62, two communication sections 64 (a first communication section 64a and a second communication section 64b), and an input/output section 66.

The processor 60 is a program control device such as a CPU that operates in accordance with a program installed in the relay apparatus 16, for example. Note that a control circuit capable of an implementation of processing that is executed by the processor 60 may be included in the relay apparatus 16 in place of the processor 60.

The storage section 62 is a storage device such as a ROM or a RAM. The storage section 62 stores a program and the like that are executed by the processor 60.

The first communication section 64a and the second communication section 64b respectively are communication interfaces such as a wireless LAN module. In the present embodiment, as illustrated in FIG. 1, the first communication section 64a and the second communication section 64b are disposed on the front side of the relay apparatus 16.

In the present embodiment, the communication standard for communication handled by the first communication section 64a differs from the communication standard for communication handled by the second communication section 64b. For example, the first communication section 64a engages in communication in the high frequency band (e.g., the 60 GHz band), and the second communication section 64b engages in communication in the low frequency band (e.g., the 5 GHz band or 2.4 GHz band).

The input/output section 66 is an input/output port such as an HDMI port or a USB port.

The display 18 according to the present embodiment is a liquid crystal display or the like, for example, and displays a video image or the like represented by a video image signal output from the entertainment apparatus 14.

The camera-microphone unit 20 according to the present embodiment includes, for example, a camera 20a that outputs data indicative of states around the camera-microphone unit 20 such as an image obtained by capturing a photographic subject to the entertainment apparatus 14. The camera 20a according to the present embodiment is a stereoscopic camera. Further, the camera-microphone unit 20 according to the present embodiment includes a microphone 20b that picks up a surrounding sound, converts the sound into audio data, and outputs the audio data to the entertainment apparatus 14.

The HMD 12 and the relay apparatus 16 are capable of transmitting and receiving data to and from each other via wireless communication, for example. The entertainment apparatus 14 and the relay apparatus 16 are connected via an HDMI cable, a USB cable, or the like, for example. The relay apparatus 16 and the display 18 are connected via an HDMI cable or the like, for example. The entertainment apparatus 14 and the camera-microphone unit 20 are connected via an AUX cable or the like, for example.

The controller 22 according to the present embodiment is an operation input apparatus operated to input an operation to the entertainment apparatus 14. The user presses a direction key or a button provided on the controller 22, or tilts an operation stick to thereby input various types of operations by using the controller 22. The controller 22 according to the present embodiment outputs input data associated with an operation input to the entertainment apparatus 14. The controller 22 according to the present embodiment further includes a USB port. The controller 22 is therefore capable of being connected to the entertainment apparatus 14 via a USB cable, and outputting input data to the entertainment apparatus 14 by wire. The controller 22 according to the present embodiment further includes a wireless communication module or the like to wirelessly output input data to the entertainment apparatus 14 as well.

In the present embodiment, it is assumed that the user wearing the HMD 12 plays a game and a video image generated by the entertainment apparatus 14 that executes a game program and output to the HMD 12 is displayed on the display section 38. Further, it is assumed that a sound generated by the entertainment apparatus 14 that executes the game program and output to the HMD 12 is output from the sound output section 42.

Further, in the present embodiment, it is assumed that the user operates the controller 22 or the like to thereby set a volume of a sound output from the sound output section 42.

In the present embodiment, a distance between the user wearing the HMD 12 and an object existing around the user such as a wall or an obstacle is further specified on the basis of an image photographed by the camera 20a or the camera section 44 and detection results by the sensor section 40. Here, a distance between the HMD 12 and the object existing around the user wearing the HMD 12 may be specified. Further, a distance between the HMD 12 and an object closest to the HMD 12 may be specified, for example. Hereinafter, a distance between the user wearing the HMD 12 and the object existing around the user, which is specified in this way, is referred to as a reference distance.

Further, in the present embodiment, an output mode (e.g., volume, frequency characteristics, or the like) of the sound output from the sound output section 42 is changed in accordance with a change in the reference distance.

Figure 3A:
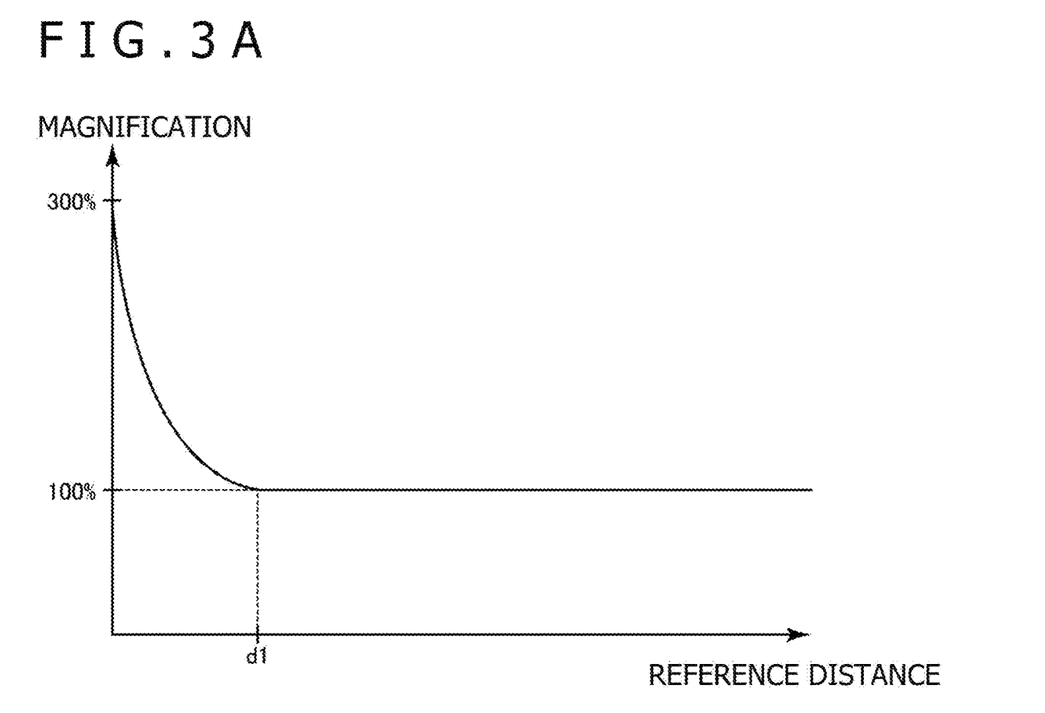
FIG. 3A is a diagram illustrating an example of a relationship between a reference distance and a magnification of a volume of an output sound.
Figure 3B:
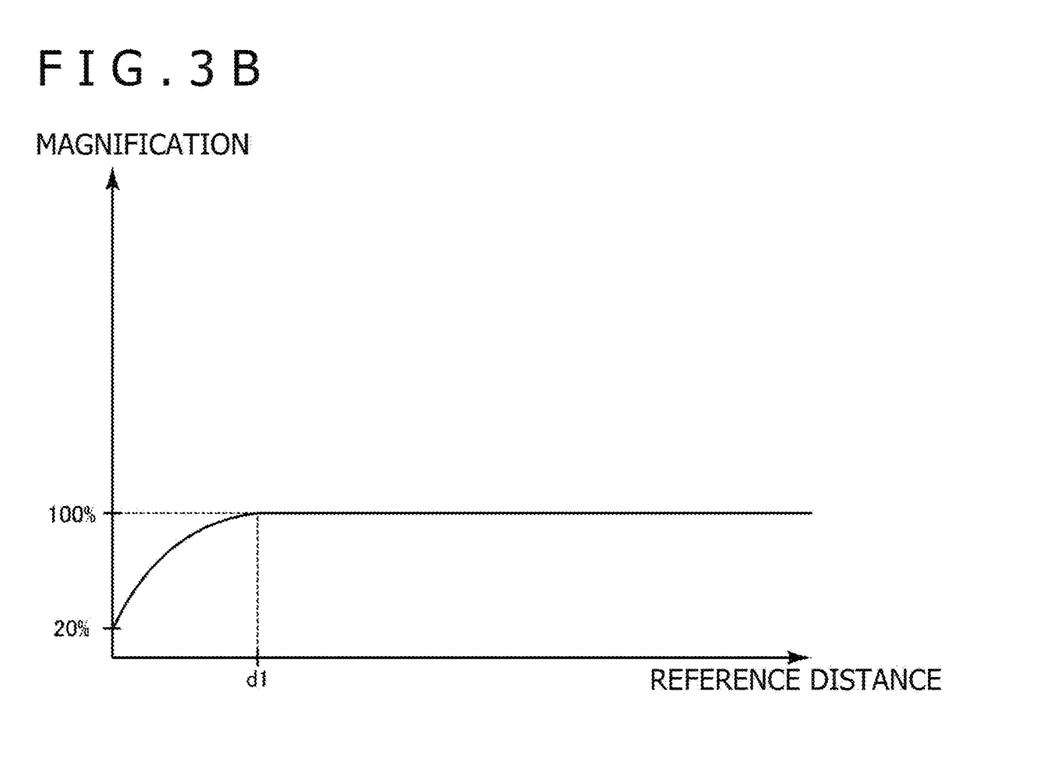
FIG. 3B is a diagram illustrating another example of a relationship between the reference distance and the magnification of the volume of the output sound.
Figure 3C:
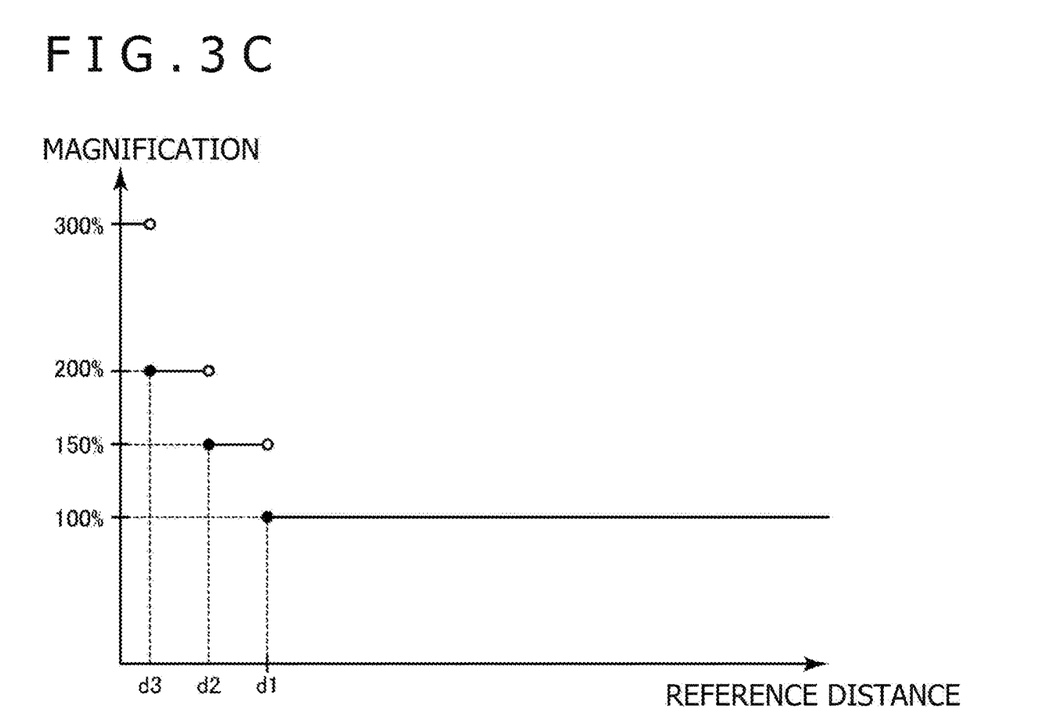
FIG. 3C is a diagram illustrating yet another example of a relationship between the reference distance and the magnification of the volume of the output sound.

FIG. 3A is a diagram illustrating an example of a relationship between the reference distance and a magnification of the volume of the output sound. FIG. 3B is a diagram illustrating another example of a relationship between the reference distance and the magnification of the volume of the output sound. FIG. 3C is a diagram illustrating yet another example of a relationship between the reference distance and the magnification of the volume of the output sound.

Here, as the reference distance is shorter, a sound may be output at larger volume, for example. As illustrated in FIG. 3A, for example, when the reference distance is shorter than a distance d1, the sound may be output at the volume larger than the volume set by the user. The sound may be output at the volume of 300% of the volume set by the user at the maximum, for example.

Further, as the reference distance is shorter, the sound may be output at smaller volume, for example. As illustrated in FIG. 3B, for example, when the reference distance is shorter than the distance d1, the sound may be output at the volume smaller than the volume set by the user. The sound may be output at the volume of 20% of the volume set by the user at the minimum, for example.

Further, the volume may change stepwise as the reference distance is shorter, for example. As illustrated in FIG. 3C, for example, when the reference distance is shorter than the distance d1, the sound may be output at the volume of 150% of the volume set by the user. Further, when the reference distance is shorter than a distance d2, the sound may be output at the volume of 200% of the volume set by the user. Further, when the reference distance is shorter than a distance d3, the sound may be output at the volume of 300% of the volume set by the user. Here, it is assumed that the distance d2 is shorter than the distance d1 and the distance d3 is shorter than the distance d2.

Further, by using a well-known image recognition technique, an output mode of the sound output from the sound output section 42 may be changed in accordance with a change in a distance between a particular object (e.g., a wall) and the HMD 12. Here, for example, the output mode of the sound output from the sound output section 42 may be changed in accordance with a change in the distance between the particular object (e.g., a wall) and the HMD 12. In this case, the distance between the particular object (e.g., a wall) and the HMD 12 corresponds to the above-described reference distance.

Further, the entire volume does not change in accordance with a change in the distance between the user wearing the HMD 12 and the object existing around the user, but frequency characteristics may change, for example. The sound output in accordance with a change in the distance between the HMD 12 and the object may be equalized and the volume of frequency components in a predetermined frequency or more may be changed, for example.

In accordance with a change in the distance between an object existing in a particular direction (e.g., the forward direction, a horizontal direction, or the like) and the HMD 12, for example, an output mode of the output sound may be changed. In this case, for example, the distance between the object existing in the particular direction and the HMD 12 corresponds to the above-described reference distance.

As described above, in the present embodiment, the output mode of the sound output to the user changes in accordance with a change in the distance between the user wearing the HMD 12 and the object existing around the user, which is generated at the time when the sound such as a sound of a game is output to the user. Therefore, as compared with a case in which a warning sound is output or a case in which an object corresponding to the object that is approached is displayed on the HMD 12, the user can be notified that the object is approached without decreasing an immersion feeling of the user.

Hereinafter, functions of the entertainment apparatus 14 according to the present embodiment and processing performed by the entertainment apparatus 14 according to the present embodiment will be further described.

Figure 4:
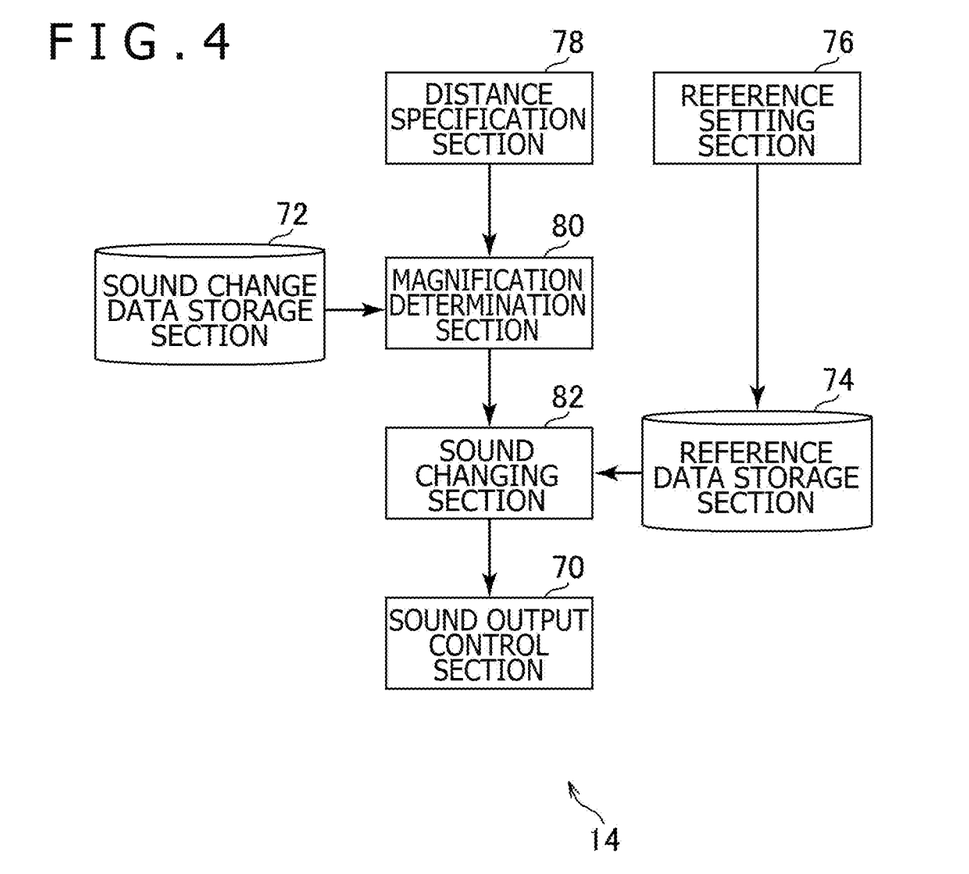
FIG. 4 is a functional block diagram illustrating an example of functions implemented by the entertainment apparatus according to the embodiment of the present invention.

FIG. 4 is a functional block diagram illustrating an example of the functions implemented by the entertainment apparatus 14 according to the present embodiment. Note that, in the entertainment apparatus 14 according to the present embodiment, all the functions illustrated in FIG. 4 need not be implemented but functions other than the functions illustrated in FIG. 4 may be implemented.

As illustrated in FIG. 4, the entertainment apparatus 14 according to the present embodiment functionally include, for example, a sound output control section 70, a sound change data storage section 72, a reference data storage section 74, a reference setting section 76, a distance specification section 78, a magnification determination section 80, and a sound changing section 82.

The sound output control section 70 is mainly implemented as the processor 50 and the input/output section 56. The sound change data storage section 72 and the reference data storage section 74 are mainly implemented as the storage section 52. The reference setting section 76 is mainly implemented as the processor 50, the communication section 54, and the input/output section 56. The distance specification section 78, the magnification determination section 80, and the sound changing section 82 are mainly implemented as the processor 50.

The above functions may be implemented by executing, by using the processor 50, a program including commands corresponding to the above functions and installed in the entertainment apparatus 14 that is a computer. The program may be supplied to the entertainment apparatus 14 via a computer readable information storage medium such as an optical disk, a magnetic disk, a magnetic tape, a magnetic optical disk, or a flash memory, or via the Internet, etc.

In the present embodiment, for example, the sound output control section 70 controls the sound to be output to the user. For example, the sound output control section 70 may transmit audio data of the sound output from the sound output section 42 of the HMD 12 to the HMD 12. In this case, the sound output section 42 of the HMD 12 may output the sound represented by the audio data received from the entertainment apparatus 14.

Here, the sound output control section 70 may reproduce an audio file stored in the storage section 52 or an information storage medium such as an optical disk or an audio stream received through a communication network such as the Internet.

In the present embodiment, for example, the sound change data storage section 72 stores sound change data for changing the output mode of the output sound. Here, the sound change data may be, for example, data indicative of a change in the output mode such as the volume of the sound output to the user or frequency characteristics in accordance with a change in the distance between the user wearing the HMD 12 and the object existing around the user. As illustrated in FIGS. 3A, 3B, and 3C, for example, data indicative of a relationship between the reference distance and a magnification of the volume of the sound output to the user may be stored in the sound change data storage section 72 as the sound change data.

The reference data storage section 74 stores reference data indicative of a reference value of the output mode of the sound output to the user. Here, the reference data may be data indicative of the reference value of the volume of the sound output to the user. Further, the reference data may be data indicative of the reference value of the volume of the sound about a plurality of frequencies respectively.

In the present embodiment, for example, the reference setting section 76 sets a value of the reference data stored in the reference data storage section 74. Here, the reference setting section 76 may set the value of the reference data so as to be a value specified by the user. In accordance with reception of operation signals from the controller 22, for example, the reference setting section 76 may change the value of the reference data stored in the reference data storage section 74.

In the present embodiment, for example, the distance specification section 78 specifies the distance between the user wearing the HMD 12 and the object existing around the user. Here, the distance specification section 78 may specify the distance between the HMD 12 and the object existing around the user wearing the HMD 12. In addition, the distance specification section 78 may specify the above-described reference distance.

Here, the distance specification section 78 may acquire an image around (e.g., before the user) the user wearing the HMD 12 in a predetermined time interval, which is photographed by the camera section 44, for example. Further, the distance specification section 78 may acquire an image of a space in which the user wearing the HMD 12 exists in a predetermined time interval, which is photographed by the camera 20a, for example. On the basis of the acquired images, the distance specification section 78 may specify the distance between the HMD 12 and the object existing around the user wearing the HMD 12, such as the above-described reference distance.

The distance specification section 78 may acquire detection results by the sensor section 40 in a predetermined time interval, for example. Further, the distance specification section 78 may acquire the detection results of a sensor that can specify a position of the object that is disposed in a room in which the user wearing the HMD 12 exists, a position of the user, a position of the HMD 12, and the like in a predetermined time interval, for example. Further, on the basis of the acquired detection results, the distance specification section 78 may specify the distance between the user wearing the HMD 12 and the object existing around the user, such as the above-described reference distance.

Note that a method for specifying a distance by the distance specification section 78 is not limited to the above-described methods.

In the present embodiment, for example, the magnification determination section 80 determines the magnification of the volume of the sound output to the user. For example, the magnification determination section 80 may determine a magnification of the volume of the controlled sound so as to be output on the basis of the sound change data stored in the sound change data storage section 72 and the reference distance specified by the distance specification section 78.

In the present embodiment, for example, the sound changing section 82 changes the output mode of the sound output to the user in accordance with a change in the distance specified by the distance specification section 78, which is generated when the sound is output to the user wearing the HMD 12. For example, the sound changing section 82 changes the output mode of the sound output-controlled by the sound output control section 70.

Here, the sound changing section 82 may change reproduction volume of an audio file or an audio stream reproduced by the sound output control section 70.

Further, the sound changing section 82 may change the output mode of the sound output to the user in accordance with a change in the distance between the user wearing the HMD 12 and the object existing around the user, which is generated when the sound is output at the volume set by the user. For example, the sound changing section 82 may change the volume, frequency characteristics, or the like of the sound output to the user in accordance with the change in the reference distance generated when the sound is output at the volume set by the user.

Further, the sound changing section 82 may change the volume of the sound output to the user so as to be output at the volume of a magnitude obtained by subtracting the volume set by the user by a magnification according to the reference distance. For example, the sound changing section 82 may change the volume of the sound output to the user into the volume obtained by subtracting the volume indicated by the reference data stored in the reference data storage section 74 by a magnification determined by the magnification determination section 80.

Further, as illustrated in FIGS. 3A, 3B, and 3C, in a case in which the reference distance is shorter than a predetermined distance (e.g., the distance d1), the sound changing section 82 may change the output mode of the sound output to the user. In this case, when the reference distance is greater than or equal to the predetermined distance (e.g., greater than or equal to the distance d1), the sound output control section 70 controls the sound of the output mode indicated by the reference data stored in the reference data storage section 74 to be output.

Figure 5:
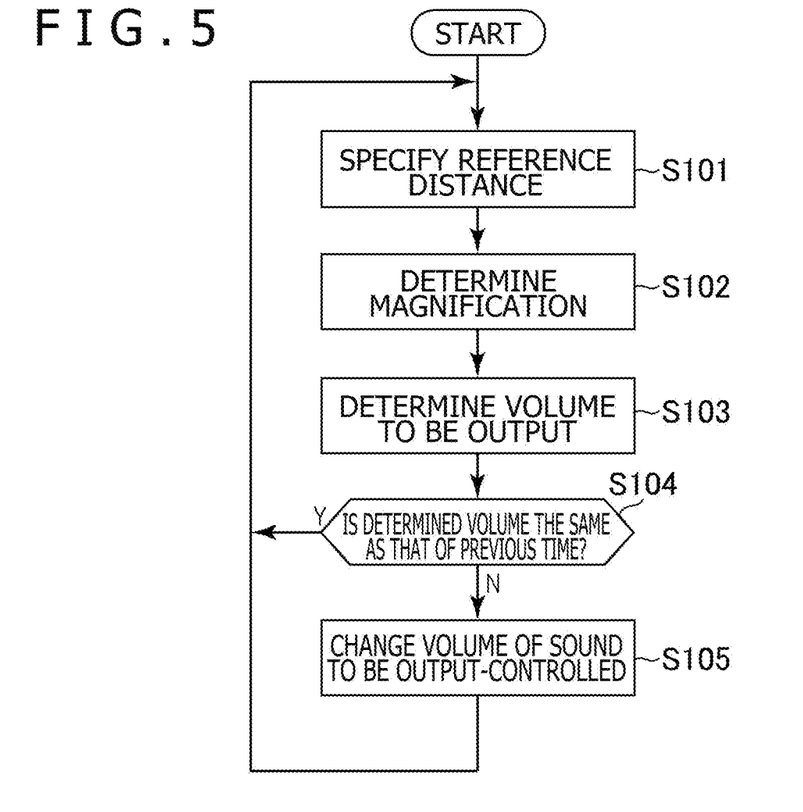
FIG. 5 is a flowchart illustrating an example of a flow of processing performed by the entertainment apparatus according to the embodiment of the present invention.

Hereinafter, an example of a flow of processing performed by the entertainment apparatus 14 according to the present embodiment will be described with reference to a flowchart exemplified in FIG. 5. Note that, in this processing example, the processes in S101 to S105 described below are repeatedly performed.

First, the distance specification section 78 specifies the reference distance as described above (S101). Then, the magnification determination section 80 determines the magnification of the volume of the sound output to the user on the basis of the voice change data stored in the sound change data storage section 72 and the reference distance specified by the process in S101 (S102).

Then, the sound changing section 82 multiplies the volume indicated by a value of the reference data stored in the reference data storage section 74 by the magnification determined by the process in S102. Further, the sound changing section 82 determines the volume in which the sound output-controlled by the sound output control section 70 ought to be output (S103).

Then, the sound changing section 82 determines whether or not the volume determined by the process in S103 in a previous loop is the same as the volume determined by the process in S103 in this loop (S104).

If it is determined that both of the volumes are the same (S104: Y), the process returns to the process in S101.

On the other hand, if it is determined that both of the volumes are not the same (S104: N), the sound changing section 82 changes the volume of the sound output-controlled by the sound output control section 70 into the volume determined by the process in S103 in this loop (S105). Then, the process returns to the process in S101.

As described above, in this processing example, the above-described processes in S101 to S105 are performed in a predetermined time interval.

Note that, in the above-described processes, the process in S104 need not be performed. For example, whenever the volume is determined by the process in S103, the sound changing section 82 may control the sound output control section 70 to output the sound at the determined volume.

Note that the present invention is not limited to the above-described embodiment.

In accordance with a change in the distance specified by the distance specification section 78, for example, not only the output mode of the sound output to the user but also the video image displayed on the display section 38 may be changed.

In a case in which the distance d2 is shorter than the distance d1, for example, when the reference distance is shorter than the distance d1, the output mode of the sound output to the user may be changed. By contrast, when the reference distance is shorter than the distance d2, the video image displayed on the display section 38 may be further changed.

For example, when the reference distance is shorter than the distance d1, the video image displayed on the display section 38 may be changed. In this case, when the reference distance is shorter than the distance d2, the output mode of the sound output to the user may be further changed. Alternatively, in this case, when the reference distance is shorter than the distance d2, the video image displayed on the display section 38 may return to a state at the time when the reference distance is greater than or equal to the distance d1. At the same time, the output mode of the sound output to the user may be changed.

For example, the output mode of the sound output to the user is not limited to the volume or frequency characteristics. An effect such as a delay or an echo may be given to the sound output to the user in accordance with a change in the distance between the HMD 12 worn by the user and the object existing around the user such as a wall or an obstacle.

Further, a part or all of the functions illustrated in FIG. 4 described above may be implemented in the HMD 12 or the relay apparatus 16.

Further, specific character strings or values described above and specific character strings or values in the figures are exemplary, and there is no restriction of such character strings or values.

The invention claimed is:

1. A sound control apparatus comprising:
   a sound output control section configured to control a sound to be output to a user,
   wherein the sound is sound from a game program or from a reproduction of recorded content;
   a distance specification section configured to specify a distance between the user wearing a head-mounted display and an object existing around the user; and
   a changing section configured to change an output mode of the sound output to the user such that a volume level of the sound increases as the distance to the object decreases.

2. The sound control apparatus according to claim 1, wherein
   the changing section further changes a frequency characteristic of the sound output to the user in accordance with the change in the distance generated when the sound is output to the user.

3. The sound control apparatus according to claim 1, wherein
   the changing section only changes the output mode of the sound output to the user when a distance between the user and the object is shorter than a predetermined distance.

4. The sound control apparatus according to claim 1, wherein
   the sound output control section reproduces a stored audio file or a received audio stream, and
   the changing section changes reproduction volume of the audio file or the audio stream reproduced by the sound output control section in accordance with the change in the distance generated when the audio file or the audio stream is reproduced.

5. A sound control method comprising:
   controlling a sound to be output to a user,
   wherein the sound is sound from a game program or from a reproduction of recorded content;
   specifying a distance between the user wearing a head-mounted display and an object existing around the user; and
   changing an output mode of the sound output to the user each that a volume level of the sound increases as the distance to the object decreases.

6. A non-transitory computer readable medium having stored thereon a program causing a computer to execute:
   a procedure for controlling a sound to be output to a user,
   wherein the sound is sound from a game program or from a reproduction of recorded content;
   a procedure for specifying a distance between the user wearing a head-mounted display and an object existing around the user; and
   a procedure for changing an output mode of the sound output to the user such that a volume level of the sound increases stepwise as the distance to the object decrease.

* * * * *